United States Patent [19]

Nishman

[11] 4,375,806
[45] Mar. 8, 1983

[54] HEATING SYSTEM

[75] Inventor: Paul J. Nishman, Seattle, Wash.

[73] Assignee: Spencer Products Company, Seattle, Wash.

[21] Appl. No.: 187,314

[22] Filed: Sep. 15, 1980

[51] Int. Cl.³ .............................................. F24J 3/02
[52] U.S. Cl. ..................................... 126/436; 126/422; 126/435; 126/400; 62/235.1
[58] Field of Search ............... 126/430, 435, 436, 400, 126/422; 237/2 B; 165/DIG. 2, 29, 104 M, 18, 104 S; 62/235.1, 238 E

[56] References Cited

U.S. PATENT DOCUMENTS

| | | | |
|---|---|---|---|
| 3,262,493 | 7/1966 | Hervey | 165/18 |
| 4,010,731 | 3/1977 | Harrison | 126/400 |
| 4,049,407 | 9/1977 | Bottum | 62/238.6 |
| 4,063,546 | 12/1977 | Schmid | 126/400 |
| 4,205,718 | 6/1980 | Balch | 165/48 S |
| 4,277,946 | 7/1981 | Bottum | 165/45 |
| 4,291,833 | 9/1981 | Franchina | 237/2 B |

FOREIGN PATENT DOCUMENTS 2803458 8/1979 Fed. Rep. of Germany ...... 126/436

*Primary Examiner*—James C. Yeung
*Attorney, Agent, or Firm*—Seed, Berry, Vernon & Baynham

[57] ABSTRACT

A heating system utilizing solar panels and buried ground conduits to collect and store heat which is delivered to a heat-pump heat exchanger. A heat-distribution fluid continuously circulates through a ground circuit to transfer heat from the ground to the heat exchanger. The ground circuit includes a length of buried ground conduit, a pump, a check valve and the heat exchanger. A solar circuit, including a solar panel and a second pump, is connected in parallel with the check valve so that the distribution fluid transfers solar heat to the heat exchanger for utilization and to the ground conduit for storage when the second pump is energized. A thermostatically instrumented control system energizes the second pump only when the temperature differential between the solar panel inlet and outlet temperatures exceeds a predetermined value and the ground temperature is less than a predetermined value. Consequently, the distribution fluid flows through the solar panel only when the panel is capable of supplying significant heat to the remainder of the system without causing excessive drying of the ground.

16 Claims, 1 Drawing Figure

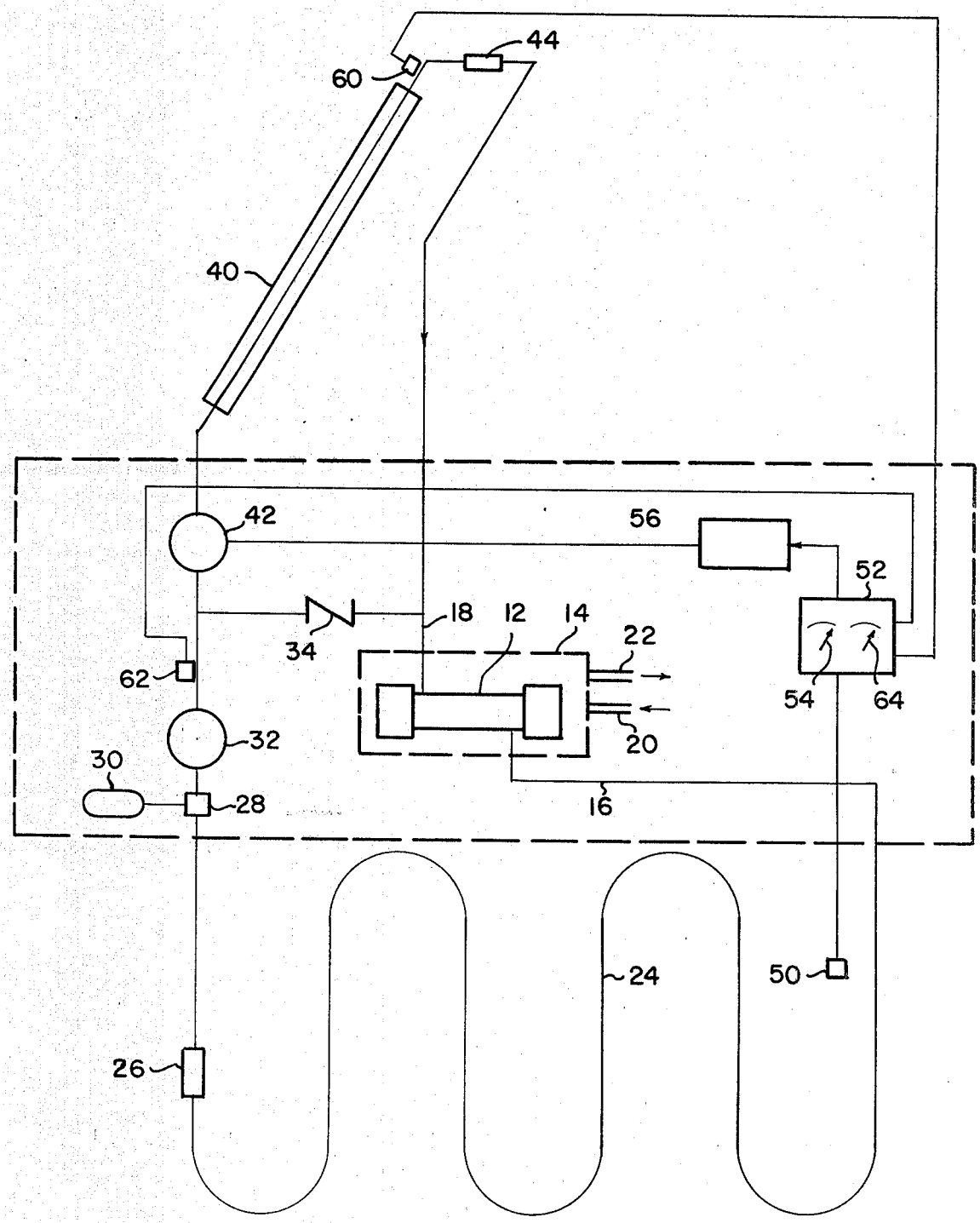

HEATING SYSTEM

BACKGROUND OF THE INVENTION

1. Field of the Invention

This invention relates to solar heating systems and, more particularly, to a solar heating system which delivers heated distribution fluid directly to a heat-pump heat exchanger or a ground conduit without causing excessive drying of the ground surrounding the conduit.

2. Description of the Prior Art

Heating systems utilizing solar heat collected by solar panels have long been in common use. In these conventional systems, a fluid flows through the solar panel, which has a relatively large surface area to maximize the quantity of solar heat absorbed by the distribution fluid. The heated distribution fluid then flows to a heat-storage device, which is typically a large insulated reservoir of the distribution fluid or a large quantity of heat-storage material, such as rocks, through which the distribution fluid flows. Heat is then transferred to a heat-utilization device, either directly, by the distribution fluid, or indirectly, through a heat exchanger. These conventional solar heating systems generally utilize a differential thermostat which causes the distribution fluid to flow only when the temperature of the fluid leaving the solar panel is significantly greater than the temperature of the fluid in the heat-storage device.

Attempts have been made to supplement the efficiency of solar heating systems by utilizing the ground as a source of heat and as a means of storing heat generated by the solar panels. Accordingly, a length of conduit is buried in the ground and the distribution fluid recirculates through the conduit and the heat-storage device. The heat-storage device thus acts as a manifold, receiving distribution fluid from and discharging distribution fluid to the solar panels, ground conduit and heat-utilization device. Although such enhancements have, in fact, improved the efficiency of solar heating systems, it has not been heretofore recognized that the efficiency of such systems has not yet been optimized. The quantity of heat transferred from the ground to the ground conduit is a function of the temperature of the ground, the "thermal mass" or specific heat of the ground, and the thermal conductivity of the ground. The ground is typically quite moist so that its thermal mass and thermal conductivity are fairly high. Thus, as the temperature of the ground is raised, a substantial quantity of heat is stored. High ground moisture also causes the thermal conductivity to be fairly high so that a relatively small temperature difference between soil and ground conduit is required to transfer a given amount of heat, and the effective heat-drawing radius of the conduit is relatively high. However, as the temperature is raised further, beyond a predetermined value which varies from area-to-area, the increased temperature removes moisture from the ground. Thereafter, although the temperature of the ground continues to increase, its thermal mass markedly decreases so that the quantity of heat stored in the ground actually decreases with an increase in temperature. More importantly, however, the reduced thermal conductivity effectively insulates the conduit from the ground. Thereafter, a greater temperature differential between conduit and ground is required to transfer a given amount of heat, and heat is absorbed from a much smaller area. Conventional solar heating systems utilizing ground conduit enhancement have not heretofore operated in a manner which prevents detrimental drying of the ground. As a result, the efficiency of these heating systems is far from optimum.

SUMMARY OF THE INVENTION

It is an object of the invention to provide a ground conduit-enhanced solar heating system which circulates a heat-distribution fluid directly to a heat-utilization device without the use of large, expensive and complex heat-storage devices located between the ground conduit, solar panels and heat-utilization device.

It is another object of the invention to operate a ground conduit-enhanced solar heating system in a manner which does not degrade the advantage of such enhancement by removing moisture from the ground.

These and other objects of the invention are provided by a heating system utilizing a heat exchanger, which may be part of a heat pump, including first and second chambers having respective inlets and outlets. A ground conduit imbedded in soil has its ends connected between the inlet and outlet of the first fluid chamber, and a pump is selectively energized to cause the fluid to flow the ground conduit. A solar panel having fluid flowing through fluid passages absorb solar heat, and the heated fluid is directed to the first chamber of the heat exchanger for utilization and to the ground conduit for storage. A temperature sensor measures the temperature of the soil adjacent the ground conduit and allows fluid to flow through the solar panels only when the temperature of the ground is below a predetermined value, thereby preventing the removal of moisture from the ground. The ground conduit forms a part of a ground circuit including a pump and a check valve connected in series with the first chamber of the heat exchanger. The solar panel forms a part of a solar panel circuit including a second pump connected in parallel with the check valve. Consequently, heat-distribution fluid flows directly to the heat exchanger from the solar panel and the ground conduit instead of first passing through a conventionally used heat-storage device. The check valve allows the distribution fluid to circulate through the heat exchanger without flowing through the solar panel, but it prevents the fluid flowing through the solar panel from flowing through the heat exchanger without also flowing through the ground conduit circuit. A differential temperature sensor actuates the pump for the solar panel circuit only when the temperature differential between the fluid leaving the solar panel and the fluid entering the panel exceeds a predetermined value corresponding to the temperature differential at which the solar panel conveys significant heat to the remainder of the system.

BRIEF DESCRIPTION OF THE DRAWING

The FIGURE is a schematic of the ground conduit-enhanced solar heating system of the present invention.

DETAILED DESCRIPTION OF THE INVENTION

The heating system, as illustrated in FIG. 1, is adapted to add heat to a distribution fluid flowing from a heat exchanger 12, which may form part of a heat pump 14, through conduit 16 so that the distribution fluid flowing into the heat exchanger 12 through conduit 18 is of a higher temperature. In a typical heat pump, a refrigeration fluid enters the heat pump through conduit 20, and it is then allowed to expand, thereby dropping in temperature. The cooled refrigeration fluid then flows through the heat exchanger 12 where its temperature is raised, and the temperature of the distribution fluid is correspondingly lowered. Finally, the refrigeration fluid flowing from the heat exchanger 12 is compressed, thereby substantially raising its temperature, and this high-temperature refrigeration fluid flows through conduit 22 to a heat-utilization device, such as a radiator. The efficiency of the heat pump increases as the temperature of the distribution fluid entering the heat exchanger 12 through conduit 18 increases. Consequently, it is highly desirable to add as much heat as possible to the distribution fluid between outlet conduit 16 and inlet conduit 18.

The distribution fluid flowing from the heat exchanger 12 through conduit 16 enters a length of conduit 24 buried in the ground at a suitable depth, such as, for example, three feet. As the distribution fluid flows through the ground conduit 24, heat from the ground is transferred to the distribution fluid so that the temperature of the distribution fluid flowing out of the ground conduit 24 is higher than the temperature of the fluid flowing into the ground conduit 24. The distribution fluid then passes through a conventional air purger 26 which removes air entrained in the distribution fluid and then flows through a second air purger 28 connected to an expansion tank 30 just upstream from a conventional pump 32. The expansion tank 30 allows the conduits and heat exchanger to remain full of distribution fluid as the distribution fluid contracts responsive to cooling. The pump 32 causes the distribution fluid to circulate through the heat exchanger 12, ground conduit 24, and a conventional check valve 34 positioned downstream from the pump 32. The check valve 34 allows fluid to flow in the direction indicated but prevents flow in the opposite direction, for a purpose explained hereinafter. The heat exchanger 12, ground conduit 24, pump 32 and check valve 34 thus form a ground circuit through which distribution fluid continuously recirculates.

As mentioned above, it is highly advantageous for a large amount of heat to be added to the distribution fluid before it enters the heat exchanger 12. Consequently, a solar panel circuit is provided for boosting the temperature of the distribution fluid when appropriate solar conditions are present. The solar panel circuit includes a conventional solar panel 40 having a relatively large area and a large number of spaced-apart fluid channels through which the distribution fluid flows. The distribution fluid thus absorbs solar heat as it flows through the solar panel 40. A second pump 42 is provided to cause the distribution fluid to flow through the solar panel 40 and another air purger 44 removes air from the distribution fluid exiting the solar panel 40. The check valve 34 prevents the distribution fluid from flowing in a circular path through the solar panel 40, check valve 34 and pump 42. Instead, the distribution fluid flowing from the solar panel 40 must flow through the heat exchanger 12 and ground conduit 24. A solenoid valve (not shown), which is closed when fluid is to flow through the solar panel 40, may be used instead of the check valve 34, thereby allowing the second pump 42 to be eliminated. However, the load on the pump 32 would then vary as the solenoid valve was actuated, producing an undesirable variation in the flow rate of the distribution fluid through the pump 32.

The solar panel 40 adds substantial heat to the distribution fluid, even under partly cloudy conditions, and it often generates substantially more heat than is absorbed by the heat exchanger 12. Under these circumstances, solar heat from the panel 40 is transferred to the ground adjacent the ground coil 24 so that solar heat is stored in the ground for subsequent utilization.

Although ground coils have been used for storing solar radiation generated by a solar panel, it has not heretofore been recognized that the quantity of heat stored in the ground can actually decrease as the temperature of the ground increases beyond a certain point. The quantity of heat stored in the ground is proportional to the product of the "thermal mass" or specific heat of the ground and its temperature. Thus, as the solar heat increases the temperature of the ground, the quantity of heat thereby stored increases. The ground, being somewhat moist, normally has a fairly high thermal mass in that it is a fairly good heat-storing material. However, as the temperature of the ground increases beyond a certain point, the heat removes moisture from the ground so that the thermal mass decreases. As the temperature continues to increase, the heat stored in the ground actually decreases because the decrease in thermal mass of the ground more than makes up for the increase in temperature. The ground temperature at which significant moisture removal occurs varies with season and location. However, in the Pacific Northwest during the winter, removal of ground moisture starts at about 45° F.

The quantity of heat stored in the ground is only one factor in determining the quantity of heat which is transferred to the ground conduit. As even more important consideration is the thermal conductivity, or insulative effect, of the ground. Moist soil has a relatively good conductivity. Consequently, a given quantity of heat is transferred to the ground conduit at a relatively low temperature differential between the ground and ground conduit. Also, the heat is transferred to the conduit from a larger area. Dry soil, on the other hand, effectively insulates the conduit from the ground so that a substantially higher temperature differential between the ground and ground conduit is required to transfer a given quantity of heat, and the heat is transferred from a substantially smaller area.

In accordance with one important aspect of the invention, a temperature sensor 50 is positioned in the ground adjacent the inlet to the ground conduit 24 for measuring the temperature of the ground. The sensor 50 is connected to a conventional thermostat 52 having an actuator 54 for selecting a manually adjustable set point. The thermostat 52 is connected to a conventional motor controller 56 which prevents the pump 42 from being energized whenever the ground temperature, as measured by the sensor 50, exceeds the set point of the thermostat 52. The solar panel 40 thus provides heat to the ground coil 24 until the ground reaches a temperature at which significant drying occurs. Thereafter, the distribution fluid bypasses the solar panel 40 by flowing through the check valve 34.

The ability of the solar panel 40 to transfer heat to the heat exchanger 12 and ground depends, of course, upon a number of circumstances, such as the intensity of the sunlight striking the panel 40 and the temperature of the ground adjacent the ground conduit 24. It is thus important to monitor the temperature of the distribution fluid flowing from the solar panel 40 and the temperature of the distribution fluid in or downstream from the ground coil 24 to ensure that the solar panel 40 is capable of generating usable heat. Accordingly, a conventional temperature sensor 60, such as a thermistor, is mounted at the outlet from the solar panel 40 for generating an electrical indication of the temperature of the distribution fluid from the solar panel 40. Another temperature sensor 62, which may also be a conventional thermistor, is mounted at the outlet of the pump 32 for measuring the temperature of the distribution fluid leaving the ground coil 24. The temperature sensors 60,62 are also connected to the thermostat 52. The thermostat 52 is a conventional differential thermostat sold by Heliotrope General which generates an output whenever the temperature measured by sensor 50 is below a predetermined value, as determined by set point adjustment 54, and the temperature differential, as measured by sensor 60 and sensor 62, exceeds a predetermined value, as determined by set point adjustment 64. The pump 42 is thus energized for causing distribution fluid to flow through the solar panel 40 whenever the temperature of the ground is below the temperature at which significant drying occurs and the temperature of the distribution fluid flowing from the solar 40 exceeds the temperature of the fluid flowing from the ground conduit 24 by a predetermined amount. In practice, a temperature differential set point of 10° F. has been advantageously used.

An important advantage of the inventive heating system is its simplicity and low cost. Conventional ground conduit-enhanced solar heating systems have heretofore utilized a large heat-storage device, such as a large tank or mass of rocks, as a manifold which communicates separately wtih the solar panel, ground conduit and heat exchanger. In these conventional systems, the distribution fluid flows directly from the solar panel to the heat-storage device, from the heat exchanger to the heat-storage device, and from the ground conduit to the heat-storage device. This system requires expensive and complex controls for regulating the flow of the solar panel circuit, ground conduit circuit and heat exchanger circuit individually, the only common element to the circuits being the heat-storage device. The inventive heating system, by allowing the distribution fluid to flow directly from the solar panel, through the heat exchanger 12 and ground coil 24, avoids the expense, complexity and size of these conventional heating systems. The system is thus markedly less expensive and space-consuming than conventional systems, and it operates in an optimum manner by not producing excessive moisture removal from the ground.

I claim:

1. In a solar and geothermal heating system having heat exchanger means for allowing heat transfer from a distribution fluid flowing through said heat exchanger means to a refrigeration fluid, a ground conduit imbedded in soil having its ends connected between the inlet and outlet of said heat exchanger, first pump means for selectively causing said distribution fluid to flow through said ground conduit, solar panel means for absorbing solar heat in a fluid flowing through a plurality of fluid passages, and solar conduit means for connecting the fluid passages of said solar panel means in series with said heat exchanger and ground conduit, the improvement comprising means for regulating the flow of said distribution fluid through said solar panel, including temperature-sensing means for measuring the temperature of soil adjacent said ground conduit and for providing an indication of said temperature measurement, and control means for allowing said distribution fluid to flow through said solar panel when the temperature indication from said temperature-sensing means is below a predetermined value and for causing said distribution fluid to bypass said solar panel when the temperature indication from said temperature-sensing means is above a predetermined value, said predetermined value corresponding to the temperature at which significant drying of said soil occurs, whereby heat from said solar panel is stored in said soil without significantly reducing the thermal mass and thermal conductivity of said soil by removing moisture therefrom.

2. The heating system of claim 1 wherein said predetermined temperature corresponds to approximately 45° F.

3. The heating system of claim 1 wherein said control means comprise selectively actuated second pump means having a first port connected to one end of said solar panel fluid passages, a check valve connected between the other ends of said solar panel fluid passages and a second fluid port of said second pump means, and switch means for actuating said second pump means when the temperature indication from said temperature-sensing means is below said predetermined value, said check valve allowing said distribution fluid to bypass said solar panel when said second pump means is not actuated while preventing circuitous flow through said solar panel, check valve and second pump means when said second pump means is actuated so that said distribution fluid flows through said solar panel.

4. The heating system of claim 1 wherein said control means comprise valve means for selectively shunting the fluid passages of said solar panel, and switch means for actuating said valve means when the temperature indication from said temperature-sensing means is above said predetermined value.

5. The heating system of claim 1, further including fluid temperature-sensing means for providing an indication of the temperature of distribution fluid flowing out of said ground conduit, and panel temperature-sensing means for providing an indication of the temperature of said solar panel, said control means receiving said fluid temperature and panel temperature indications and preventing said distribution fluid from flowing through said solar panel unless said panel temperature indication is larger than said fluid temperature indication by a predetermined temperature differential.

6. The heating system of claim 5 wherein said predetermined temperature differential corresponds to approximately 10° F.

7. The heating system of claim 5 wherein said panel temperature-sensing means measures the temperature of said panel near the outlet of said solar panel so that said panel temperature indication represents the heat available for transfer to the soil surrounding said ground conduit.

8. The heating system of claim 1 wherein said temperature-sensing means measures the temperature of said soil adjacent the inlet of said ground conduit so that when said soil is transferring heat to said distribution fluid, said temperature indication represents the maximum temperature of said soil.

9. A solar and geothermal heating system, comprising:
a heat pump compressing relatively cold refrigerant fluid received from an inlet and discharging relatively hot refrigerant fluid from an outlet, said heat pump including a heat exchanger having a first chamber through which said refrigerant flows before being compressed and a second chamber through which a distribution fluid flows to preheat said refrigerant fluid before compressing;

a length of ground conduit embedded in soil;

a solar panel having a plurality of fluid passages for absorbing solar heat;

a fluid pump causing said distribution fluid to flow through said ground conduit and the passages of said solar panel;

conduit means for connecting one end of said ground conduit and one end of the fluid passages of said solar panel directly to the second chamber of said heat exchanger and for connecting the other end of said ground conduit to the other ends of the fluid passages of said solar panel; and control means for selectively allowing said distribution fluid to bypass said solar panel when the temperature of the soil adjacent said ground unit is hotter than a temperature at which significant drying of said soil occurs, thereby preventing a reduction in the thermal mass of said soil.

10. The heating system of claim 9 wherein said control means comprise a second pump connected in series with said solar panel, a check valve connected in parallel with said second pump and solar panel in a direction preventing fluid flow in a circuitous path through said pump, panel and valve, temperature-sensing means for measuring the temperature of said soil and for providing an indication thereof, and switch means for actuating said second pump when the temperature indication from said temperature-sensing means corresponds to a temperature below the temperature at which significant drying of said soil occurs.

11. The heating system of claim 10, further including fluid temperature-sensing means for providing an indication of the temperature of distribution fluid flowing out of said ground conduit, and panel temperature-sensing means for providing an indication of the temperature of said solar panel, said control means receiving said fluid temperature and panel temperature indications and preventing said distribution fluid from flowing through said solar panel unless said panel temperature indication is larger than said fluid temperature indication by a predetermined temperature differential.

12. A solar and geothermal heating system, comprising:

a heat pump compressing relatively cold refrigerant fluid received from an inlet and discharging relatively hot refrigerant fluid from an outlet, said heat pump including a heat exchanger having a first chamber through which said refrigerant fluid flows before being compressed and a second chamber through which a distribution fluid flows to preheat said refrigerant fluid before being compressed;

a length of ground conduit imbedded in soil;

a first pump connected in series with said ground conduit;

a solar panel having a plurality of fluid passages for absorbing solar heat;

a second pump connected in series with the fluid passages of said solar panel;

a check valve connected in parallel with said second pump and solar panel and with said first pump and ground conduit in a direction preventing fluid flow in a circuitous path through said second pump, solar panel and check valve while allowing fluid flow in a circuitous path through said first pump, ground conduit, heat exchanger and check valve;

ground temperature-sensing means for measuring the temperature of soil adjacent said ground conduit and for providing an indication of said temperature measurement;

fluid temperature-sensing means for providing an indication of the temperature of fluid flowing out of said ground conduit;

panel temperature-sensing means for providing an indication of the temperature of said solar panel; and control means for actuating said second pump when the temperature indication from said temperature-sensing means corresponds to a temperature lower than a predetermined temperature at which significant drying of said soil occurs and said panel temperature indication is larger than said fluid temperature indication by a predetermined temperature differential.

13. The heating system of claim 12 wherein said predetermined temperature corresponds to approximately 45° F.

14. The heating system of claim 13 wherein said predetermined temperature differential corresponds to approximately 10° F.

15. The heating system of claim 14 wherein said panel temperature-sensing means measures the temperature of said panel near the outlet of said solar panel so that said panel temperature indication represents the heat available for transfer to the soil surrounding said ground conduit.

16. The heating system of claim 15 wherein said temperature-sensing means measures the temperature of said soil adjacent the inlet of said ground conduit so that when said distribution fluid is absorbing heat from said soil, said temperature indication represents the maximum temperature of said soil.

* * * * *